United States Patent [19]
Hickman

[11] Patent Number: 5,880,944
[45] Date of Patent: Mar. 9, 1999

[54] RESONANT CONVERTERS

[75] Inventor: Kevin Hickman, Oxon, England

[73] Assignee: Oxford Magnet Technology Limited, England

[21] Appl. No.: 820,375

[22] Filed: Mar. 12, 1997

[30] Foreign Application Priority Data

Mar. 23, 1996 [GB] United Kingdom ................. 9606195.7

[51] Int. Cl.⁶ .................................................. H02M 3/335
[52] U.S. Cl. ................................................. 363/65; 363/17
[58] Field of Search .................. 363/16, 17, 97, 363/98, 131, 132, 65, 68

[56] References Cited

U.S. PATENT DOCUMENTS

| | | | |
|---|---|---|---|
| 4,523,269 | 6/1985 | Baker et al. ............................ | 363/138 |
| 4,805,081 | 2/1989 | Chambers et al. ........................ | 363/96 |
| 5,343,177 | 8/1994 | Williams .................................. | 333/213 |

FOREIGN PATENT DOCUMENTS

| | | |
|---|---|---|
| 0297708A2 | 1/1989 | European Pat. Off. . |
| 1088482 | 10/1967 | United Kingdom . |
| 1439254 | 6/1976 | United Kingdom . |
| 1408904 | 10/1995 | United Kingdom . |

*Primary Examiner*—Matthew Nguyen
*Attorney, Agent, or Firm*—Evenson, McKeown,Edwards & Lenahan, P.L.L.C.

[57] ABSTRACT

A resonant converter arrangement comprises two resonant converters, each having a resonant circuit through which current is switched alternately in opposite directs by respective switch elements. The outputs of the two resonant converters are combined to provide an output of the arrangement which has an amplitude that is dependent upon the relative phase of the outputs of the two resonant converter. For the later purpose, switch controller controls the switch element for one of the two resonant converters, in accordance with such relative phase of the two resonant converters.

8 Claims, 3 Drawing Sheets

IN PHASE  OUT OF PHASE

RESONANT CONVERTERS

BACKGROUND OF THE INVENTION

This invention relates to resonant converters of the type which are commonly used for converting one source of electrical energy to another source having predetermined characteristics. Such resonant converters are well generally comprise a series resonant circuit, through which current is switched alternately in opposite directions at a frequency close to the resonant frequency of the circuit; an output is developed across one element of the resonant circuit, with an amplitude that can be controlled in accordance with the switching frequency.

These known resonant converters have the disadvantage that control of an output current by controlling the switching frequency will normally only permit an output current reduction down to about 5% of a nominal output current, and thus current reduction from nominal down to zero is not feasible. Moreover, wide switching frequency variations, say from 20 kHz to 60 kHz, produce a correspondingly wide variation in noise which is undesirable for some applications wherein a predictable noise spectrum associated with a constant switching frequency would be an advantage.

It is, therefore, an object of the present invention to provide a resonant converter in which the foregoing shortcomings of the known converters are obviated or diminished.

SUMMARY OF THE INVENTION

According to the present invention, a resonant converter arrangement comprises two resonant converters, each having a resonant circuit through which current is switched alternately in opposite directions, by respective switch means. The outputs of the two resonant converters are combined to provide an output of the arrangement, which has an amplitude that is dependant upon the relative phase of the outputs of the two resonant converters. For the latter purpose, a switch controller controls the switch means for one of the two resonant converters, in accordance such relative phase of the two resonant converters.

The phase of one of the two resonant converters may be phase-locked to other of the two resonant converters by means of a phase-locked loop.

The phase-locked loop may comprise a phase detector responsive to the outputs of the two converters for providing a feedback signal that is dependent upon the phase difference therebetween. The feedback signal is fed back via signal combining means to control the phase of one of the two converters so that it bears a predetermined phase relationship to the phase of the other of the two converters as determined by the amplitude of a demand signal contribution fed into the signal combining means.

The signal combining means may comprise a first combiner in which a demand signal level is combined with a signal level derived from the output of the resonant converter arrangement, thereby to provide a resultant signal, and a second combiner in which the resultant signal and the feedback signal are combined to provide a control signal effective to control the phase of the one of the two resonant converters having an output which is phase-locked to the other.

The outputs of the two resonant converters may be combined in a transformer and fed via a bridge rectifier to provide a d.c. output.

Resonant converters find wide application, but the present invention is especially concerned with the provision of a resonant converter arrangement for use in 'running up' the magnet of a magnetic resonance imaging (MRI) system as used for medical diagnostic purposes. In this kind of application, it is necessary to control a current fed to the magnet during the 'running up' procedure, from zero to a maximum required level which may be of the order of 400 amps. Moreover, for this application, a predictable noise spectrum is a distinct advantage and thus a phase-locked system wherein wide frequency variation is not required is particularly attractive.

Other objects, advantages and novel features of the present invention will become apparent from the following detailed description of the invention when considered in conjunction with the accompanying drawings.

DETAILED DESCRIPTION OF THE DRAWINGS

Figure 1:
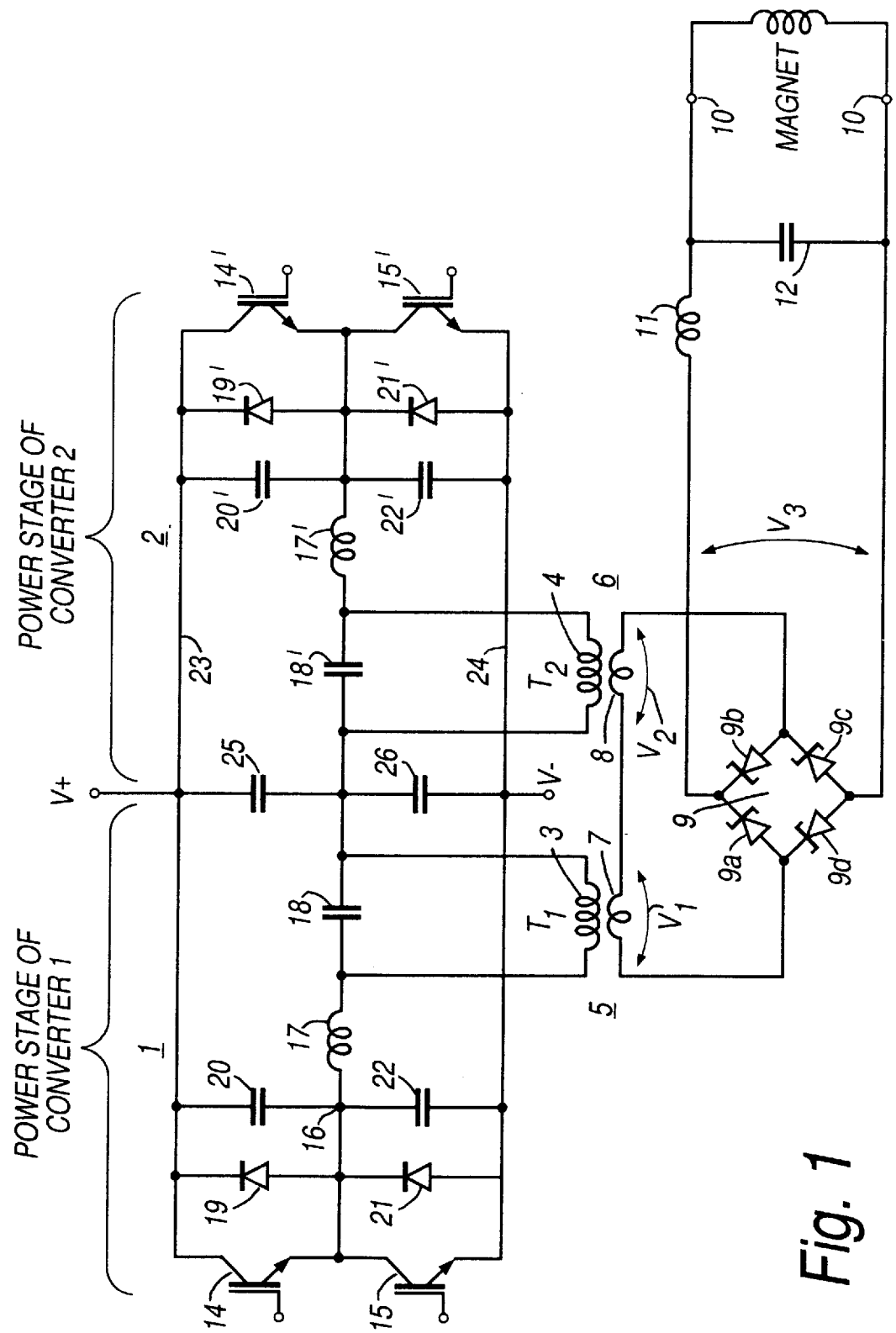
FIG. 1 is a partially schematic circuit diagram of a resonant converter arrangement.
Figure 2:
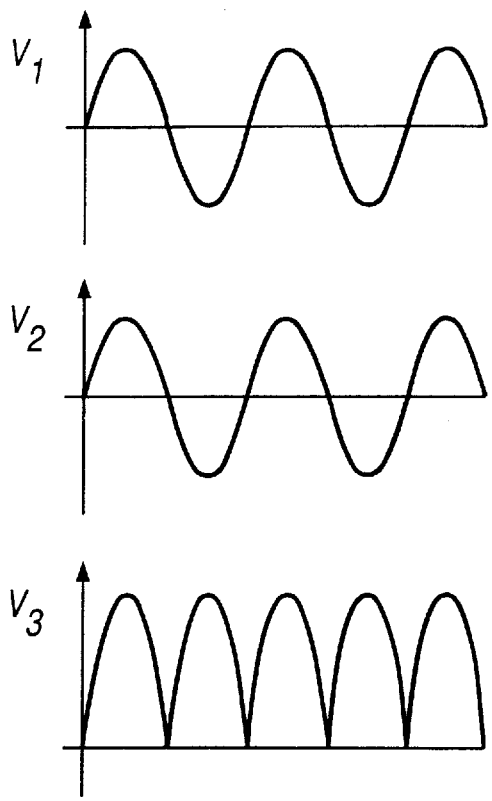
FIG. 2 is a waveform diagram showing various waveforms appertaining to the circuit of FIG. 1.
Figure 2:
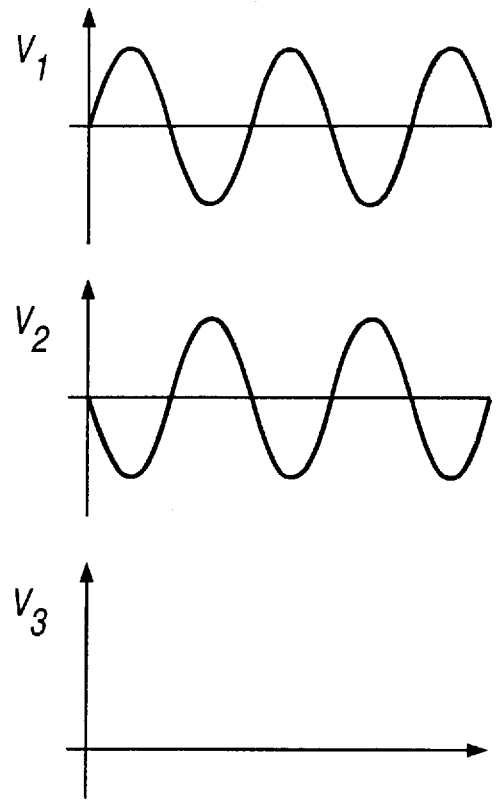

Referring now to FIG. 1, a resonant converter arrangement comprises two resonant converters 1 and 2 which are arranged to feed the primary windings 3 and 4 of a pair of transformers 5 and 6, the secondary windings 7 and 8 of which are connected in series so that voltages V1 and V2 developed therein are combined. This combined voltage is fed to a bridge rectifier 9 comprising diode elements 9a, 9b, 9c and 9d. A rectified output V3 from the rectifier 9 is applied to output terminals 10 via a series inductor 11 and a shunt capacitor 12 which serve in combination for smoothing purposes. In the present example, the output voltage V3 is shown schematically as applied via smoothing components 11 and 12 to an electromagnet winding 13 which forms part of an MRI system. As shown in FIG. 2, when the voltages V1 and V2 at the secondary windings 7 and 8 respectively of the transformers 5 and 6 are in phase, a large output V3 is present. If, however, the wave forms at the secondary windings 7 and 8 are 180° out of phase, then the output V3 will be zero. Thus intermediate values of V3 between zero and maximum are selectable in accordance with the relative phase of the signals V1 and V2.

The converters 1 and 2 are generally similar in construction and, in the case of the converter 1, it comprises a pair of switching transistors 14 and 15 which are serially connected. A junction 16 between the transistors is connected to a series resonant circuit comprising an inductor 17 and a capacitor 18, the transistor 14 being shunted by a diode 19 and a capacitor 20, and the transistor 15 being shunted by a diode 21 and a capacitor 22. The transistors 14 and 15 are connected between a pair of supply rails 23 and 24, and, in order to define a mid-potential between these supply rails 23 and 24, a pair of similar capacitors 25 and 26 are provided connected in series between the supply rails 23 and 24, with their junction connected to the capacitor 18 of the resonant circuit. Since corresponding parts of the converter 2 are substantially the same as the parts as just before described of the converter 1, they are shown bearing the same numerical designations distinguished only by a 'dash' suffix.

It will be appreciated that, by controlling the relative phase of the converters 1 and 2, the voltage V3 can be controlled from a maximum down to zero in dependence upon the relative phase relationship between the two converters 1 and 2.

Figure 3:
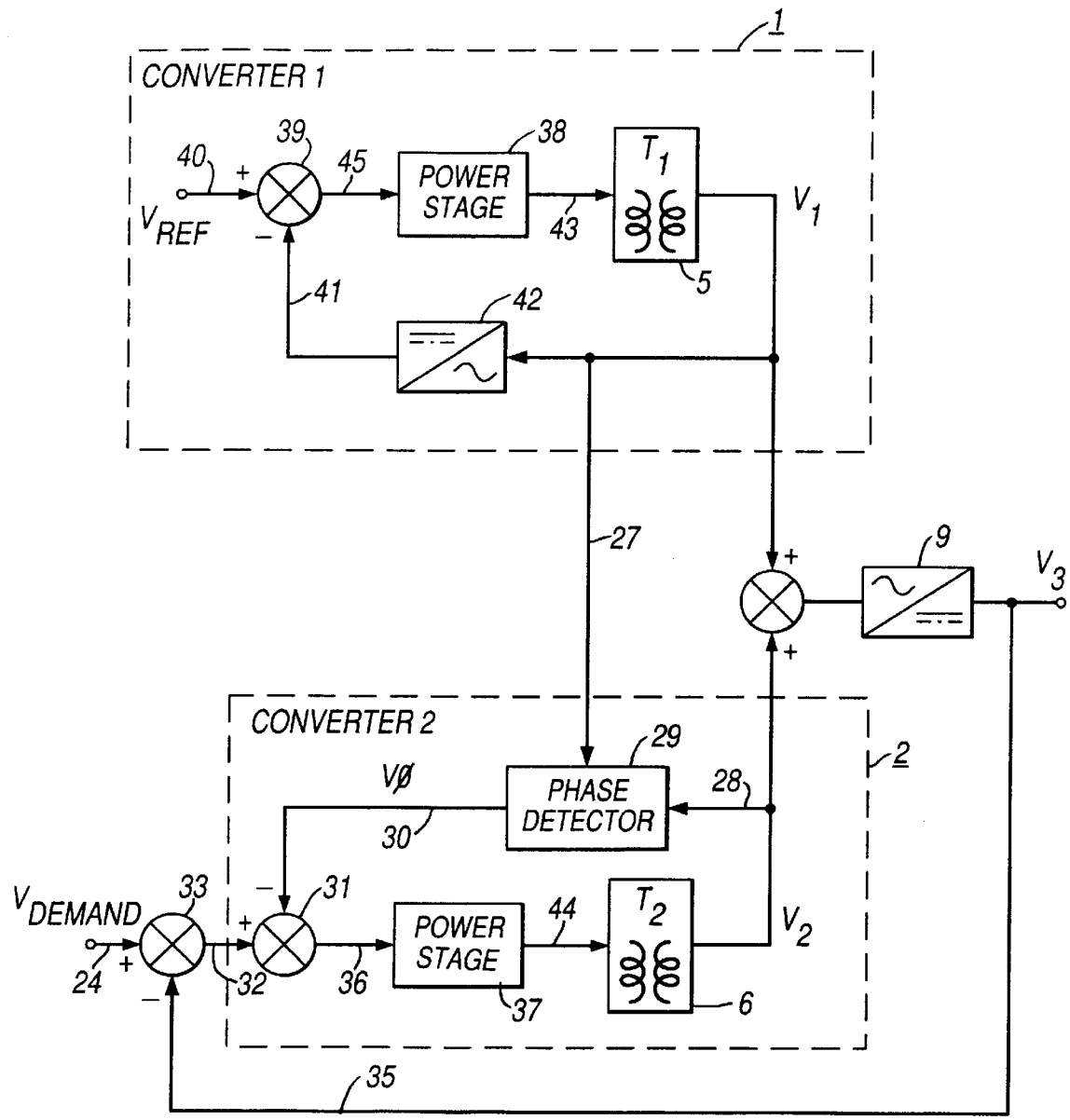
FIG. 3 is a schematic block diagram of an apparatus for controlling the circuit of FIG. 1.

Referring now to FIG. 3, an arrangement for controlling the relative phase of the converters 1 and 2 will now be described. In order to control the relative phase of the two converters, samples of the voltages V1 and V2 developed at the output of transformers 5 and 6 respectively are fed via lines 27 and 28 respectively to a phase detector 29. In the presence of a phase difference between the signals on the lines 27 and 28, an output signal from the phase detector 29 is produced on a line 30 which is fed to a signal combiner 31. The signal combiner 31 is fed also with a resultant signal on a line 32 from a further signal combiner 33 which is fed on a line 34 with a reference signal and on a line 35 with a feedback signal corresponding to a sample of the output voltage V3 from the arrangement which is developed at the output of the rectifier 9 as shown in FIG. 1. The combiner 31 thus provides a signal on a line 36 which is fed via a power stage 37 to control the frequency of the converter 2. For this purpose, the power stage 37 is shown connected to the transformer 6 to close a feedback loop of which it forms a part. Similarly, the transformer 5 is shown driven by a power stage 38 from a combiner 39 which is fed with a reference signal on line 40 and with a feedback signal on a line 41 via a rectifier 42 which derives a signal from the transformer 5.

It will be appreciated that signals on the lines 45 and 36 in FIG. 2, which feed the power stages 38 and 37 and then the transformers 5 and 6 respectively, will be used to control the switching frequencies of the converters 1 and 2 respectively. Switching frequency control of inverters is well known and may be effected in accordance with any known technique. It will be appreciated that the frequency of the resonant converter 1 will initially be adjusted appropriately in accordance with the reference voltage on the line 40. The two converters 1 and 2 are then phase-locked by operation of the phase-locked loop, the relative phase between them determining the output voltage and being set in accordance with the amplitude of the voltage applied to line 34.

Various modifications may be made to the arrangement just before described without departing from the scope of the invention and, for example, any suitable kind of resonant converter or phase control system may be used.

I claim:

1. A resonant converter arrangement comprising:
    a first resonant converter having a resonant circuit through which current is switched alternately in opposite directions, the converter providing a first signal;
    a second resonant converter having a resonant circuit through which current is switched alternately in opposite directions, the converter providing a second signal;
    first switching means for controlling the switching frequency of the current in the first resonant converter at a fixed frequency;
    second switching means for controlling the switching frequency of the current in the second resonant converter at a fixed frequency;
    signal combining means for combining the first and second signals to provide an output signal; and
    a switch controller for controlling the second switching means in accordance with relative phase of said first and second signals to control the amplitude of the output signal.

2. A resonant converter arrangement as claimed in claim 1, wherein the phase of one of said first and second resonant converters is phase-locked to the other of said first and second resonant converters by means of a phase-locked loop.

3. A resonant converter arrangement as claimed in claim 2, wherein the phase-locked loop comprises a phase detector responsive to said first and second signals from said first and second resonant converters for providing a feedback signal in dependence upon the phase difference therebetween, which feedback signal is fed back via said signal combining means to control the phase of said second resonant converter so that it bears a predetermined phase relationship to the phase of said first resonant converter as determined by the amplitude of a demand signal fed into the signal combining means.

4. A resonant converter arrangement as claimed in claim 3, wherein the signal combining means comprises a first combiner in which a control signal is combined with said output signal of said resonant converter arrangement thereby to provide a resultant signal, and a second combiner in which the resultant signal and the feedback signal are combined to provide a control signal effective to control the phase of said second resonant converter.

5. A resonant converter arrangement as claimed in claim 1, wherein said first and second signals from said first and second resonant converters are combined in a transformer and fed via a bridge rectifier to provide a d.c. output.

6. An MRI system including a resonant converter arrangement as claimed in claim 1.

7. A resonant converter arrangement comprising two resonant converters, each having a resonant circuit through which current is switched alternately in opposite directions by respective switch means which are responsive to a switch controller, the outputs of the two resonant converters being mutually combined to provide an output of the arrangement the amplitude of which is controlled in dependence upon the relative phase of the outputs of the two resonant converters, wherein:
    the phase of one of the two resonant converters is phase-locked to the other of the two resonant converters by means of a phase-locked loop; and
    the phase-locked loop comprises a phase detector responsive to the outputs of the two converters for providing a feedback signal in dependence upon the phase difference therebetween, which feedback signal is fed back via signal combining means to control the phase of one of the two converters so that it bears a predetermined phase relationship to the phase of the other of the two converters as determined by the amplitude of a demand signal contribution fed into the signal combining means.

8. A resonant converter arrangement as claimed in claim 7, wherein the signal combining means comprises a first combiner in which a control signal level is combined with a signal level derived from the output of the resonant converter arrangement thereby to provide a resultant signal, and a second combiner in which the resultant signal and the feedback signal are combined to provide a control signal effective to control the phase of the said one of the two resonant converters.

* * * * *